United States Patent
Aftanas et al.

(10) Patent No.: US 6,722,541 B1
(45) Date of Patent: Apr. 20, 2004

(54) ARTICLE CARRIER FOR A TRUCK BED

(75) Inventors: Jeffrey M. Aftanas, Ortonville, MI (US); Gerard J. Kmita, Allen Park, MI (US); Milton J. Antonick, Royal Oak, MI (US); Donald R. Potter, Clarkston, MI (US)

(73) Assignee: JAC Products Inc., Saline, MI (US)

(*) Notice: Subject to any disclaimer, the term of this patent is extended or adjusted under 35 U.S.C. 154(b) by 0 days.

(21) Appl. No.: 10/277,574

(22) Filed: Oct. 22, 2002

(51) Int. Cl.[7] ................................................ B60R 9/04
(52) U.S. Cl. ........................ 224/403; 224/321; 224/327; 296/37.6
(58) Field of Search ................................ 224/321, 322, 224/323, 324, 325, 326, 327, 403; 296/37.6, 37.7; 410/143, 150, 151

(56) References Cited

U.S. PATENT DOCUMENTS

| | | | | |
|---|---|---|---|---|
| 3,471,045 A | * | 10/1969 | Panciocco | 296/37.6 |
| 4,236,854 A | * | 12/1980 | Rogers | 410/143 |
| 4,449,656 A | | 5/1984 | Wouden | |
| 4,772,165 A | * | 9/1988 | Bartkus | 224/403 |
| 5,071,050 A | | 12/1991 | Pudney et al. | |
| 5,088,636 A | * | 2/1992 | Barajas | 296/37.6 |
| 5,139,375 A | * | 8/1992 | Franchuk | 224/321 |
| 5,688,087 A | | 11/1997 | Stapleton et al. | |
| 5,732,863 A | * | 3/1998 | Stapleton | 224/321 |
| 5,988,722 A | * | 11/1999 | Parri | 224/403 |
| 6,340,106 B1 | * | 1/2002 | Dutton | 224/403 |

\* cited by examiner

*Primary Examiner*—Gary E. Elkins
(74) *Attorney, Agent, or Firm*—Harness Dickey & Pierce P.L.C.

(57) ABSTRACT

A vehicle article carrier adapted for use with outer body surfaces of a vehicle that are curved or non-parallel to one another. The article carrier includes a pair of non-linear slats that are secured in spaced apart relation to one another on the outer body surfaces. A cross bar supporting assembly has a pair of connecting members that support a cross bar at its outermost ends. The connecting members are secured to slider members, and the slider members are adapted to be secured to the slats. The connecting members are secured to the outermost ends of the cross bar and each have bores that enable the outermost ends to be gradually received therewithin as the cross bar is moved along portions of the slats where the distance between the slats decreases, thus effectively shortening the cross bar. Conversely, this coupling enables the length of the cross bar to be effectively lengthened to accommodate increases in the distance between the slats. Each connecting member further includes a slider having a curved face portion which couples to an associated one of the slats and which further helps to prevent jamming of the cross bar as it is moved along the curved or non-parallel slats.

21 Claims, 5 Drawing Sheets

ARTICLE CARRIER FOR A TRUCK BED

FIELD OF THE INVENTION

The present invention relates to vehicle article carriers. More particularly, the present invention relates to a vehicle article carrier having a cross bar that is capable of being supported from a pair of slats for adjustable movement along the slats, and where the slats are non-linear or are mounted in an slightly non-parallel arrangement on the outer body surface of a vehicle.

BACKGROUND OF THE INVENTION

Vehicle article carriers are used in a wide variety of applications for supporting and securing articles of various sizes above an outer surface of a vehicle. Typically, vehicle article carriers include a pair of slats or side rails (i.e. support rails) that are secured to the outer body surface of the vehicle. Usually, the side rails are straight and extend parallel to each other. The side rails are typically secured along a major longitudinal length of the vehicle roof, rear deck lid, or other surface of a vehicle.

Usually, at least one cross bar is supported from the two slats or side rails. The cross bar is secured to each support rail by brackets that are rigidly fastened to each end of the cross bar. Each bracket is slidably secured to one of the support rails to allow for adjustable movement of the cross bar along the support rails.

Typically, a tap plate extends from each bracket and is disposed within an associated one of the support rails. The tap plate may be threadably engaged with a user actuable, rotatable locking knob or like element that allows the user to effectively lock each end of the cross bar at a desired position along its associated support rail. Thus, the cross bar can be securely positioned as needed to accommodate a variety of articles having many different shapes and dimensions.

Current vehicle article racks perform adequately for their intended purpose when both side rails are straight and parallel. However, due to the fixed length of the cross bar, many current vehicle article carrier systems are not suitable for use with support rails that are not spaced parallel to each other. For example, when a cross bar of fixed length is moved along support rails that are not parallel, the support brackets of the cross bar may jam between the support rails as the distance between the support rails decreases. Further, as the cross bar is moved in the direction of increasing distance between the support rails, the support brackets may also jam.

Also, current vehicle article carriers are not suitable for use with curved (i.e., bowed) side rails. Specifically, as the cross bar is moved along the curved rails, the cross bar and its associated brackets may become jammed within the side rails at the midpoints of the side rails where the spacing between the side rails is greatest.

One system dealing with this problem is disclosed in U.S. Pat. No. 6,279,802, issued Aug. 28, 2001, and assigned to the assignee of the present application, the disclosure of which is hereby incorporated by reference. This system has proven effective for compensating for a degree of non-linearity in the support rails, or non-parallel spacing of the support rails of a vehicle article carrier system. Nevertheless, it would be desirable to provide a vehicle article carrier system that is more specifically intended to accommodate movement of a cross bar along bowed support rails, or along support rails that are non-parallel to one another to a very significant degree.

SUMMARY OF THE INVENTION

The present invention is directed to a vehicle article carrier having a cross bar support member that is capable of being moved along a pair of supporting rails that are curved (i.e., "bowed") and/or not parallel to one another. The article carrier is generally comprised of at least two side rails that are adapted to be fixedly secured to an outer body surface of a vehicle, a cross bar, and at least two cross bar support assemblies. The cross bar support assemblies are comprised of a slider and a connecting member. The connecting member secures the cross bar to the slider and the slider is secured to an associated one of the support rails.

The cross bar is able to effectively extend and contract in overall length. This is achieved through the use of the connecting member at each end thereof. The connecting members allow end portions of the cross bar to slide into and out of each of the connecting members. For example, as the cross bar is moved to a point where the support rails are spaced closer together, the ends of the cross bar recede within the connecting members. However, as the cross bar is moved along the support rails, as the distance between the support rails is increasing, then the connecting members are able to move apart from one another to effectively lengthen the cross bar.

To even better allow the slider to slide along side rails that are curved, each connecting member is pivotably coupled to its associated slider. Each slider further includes a curved side rail contact portion. Thus, as each slider moves along side rails that are bowed outwardly relative to one another, the connecting members pivot and the cross bar effectively lengthens from the connecting members to follow the curve. As the slider moves along side rails that are bowed inwardly to one another, the connecting members pivot and the cross bar outer ends recede within the connecting members to effectively shorten the cross bar and allow the sliders to follow the curvature of the support rails. The curved support rail contact portion allows the slider to easily follow curved support rails without becoming jammed within the support rails.

Further areas of applicability of the present invention will become apparent from the detailed description provided hereinafter. It should be understood that the detailed description and specific examples, while indicating at least one preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
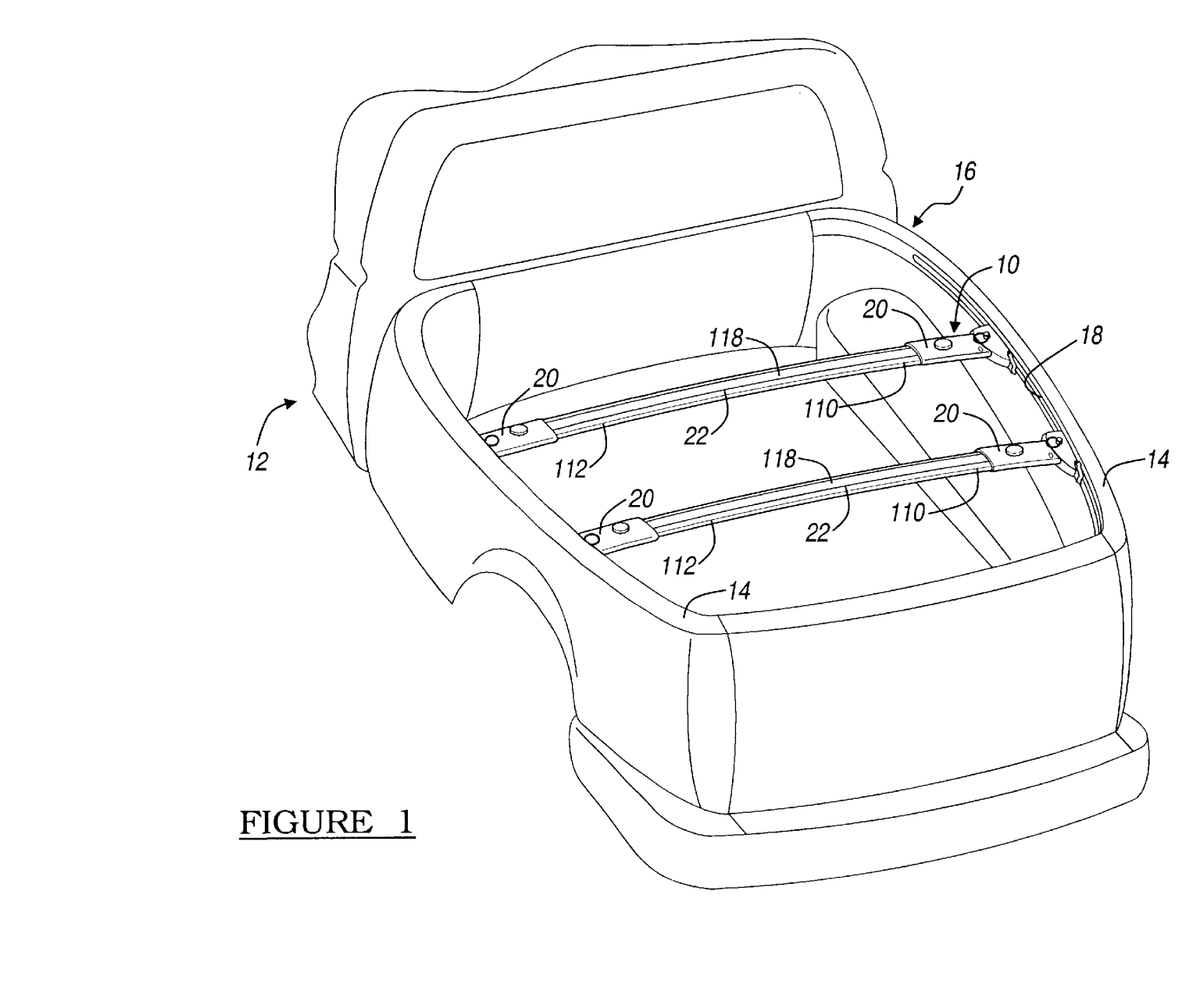
FIG. 1 is a perspective view of a vehicle including a vehicle article carrier apparatus in accordance with a preferred embodiment of the present invention.

Referring to FIG. 1, there is shown a vehicle article carrier apparatus 10 in accordance with a preferred embodiment of the present invention. The article carrier apparatus 10 is shown installed on an exemplary motor vehicle, illustrated as a pick-up truck 12. Specifically, the apparatus 10 is shown installed along the bed walls 14 of a truck bed 16. While FIG. 1 shows the apparatus 10 secured to bed walls 14, it will be appreciated that the apparatus 10 can just as readily be secured to a roof area or other area of the vehicle 12 with little or no modification to the apparatus 10. Also, the illustration of the apparatus 10 being installed for use on a pick-up truck is only for illustrative purposes. The apparatus 10 is suitable for use on virtually any form of vehicle (e.g. sport utility vehicle, station wagon, sedan, etc.) where there is a need for curved or bowed support rails to be employed. The apparatus 10 could also be employed (albeit on a smaller scale) with a little or no modification inside a cargo area of a vehicle if desired.

The apparatus 10 generally includes a pair of support rails in the form of elongated slats 18 (only one being visible in FIG. 1), at least two cross bar support assemblies 20, and at least one cross bar 22. It will be appreciated that in many applications two adjustably positionable cross bars will be used, but that one of the cross bars 22 could just as readily comprise a fixed (i.e., non-movable) cross member. For the purpose of discussion and illustration both of the cross bars 22 are adjustable cross bars.

Slats 18 are secured to each bed wall 14 such that the slats 18 extend preferably at least a substantial portion of the length of the bed walls 14. Each cross bar 22 extends between the slats 18 and is secured to the slats 18 by its associated cross bar support assemblies 20.

It will be appreciated that while the slats 18 have been illustrated as slats attached to interior wall surfaces of the bed walls 14 in FIG. 1, the slats 18 may just as easily be formed as slide rails and supported elevationally above the bed walls 14 by suitable support feet at opposite ends thereof. Thus, the teachings of the present invention are not limited only to the use of slats, but also include the use of side rails that are elevationally positioned over a surface.

Figure 2:
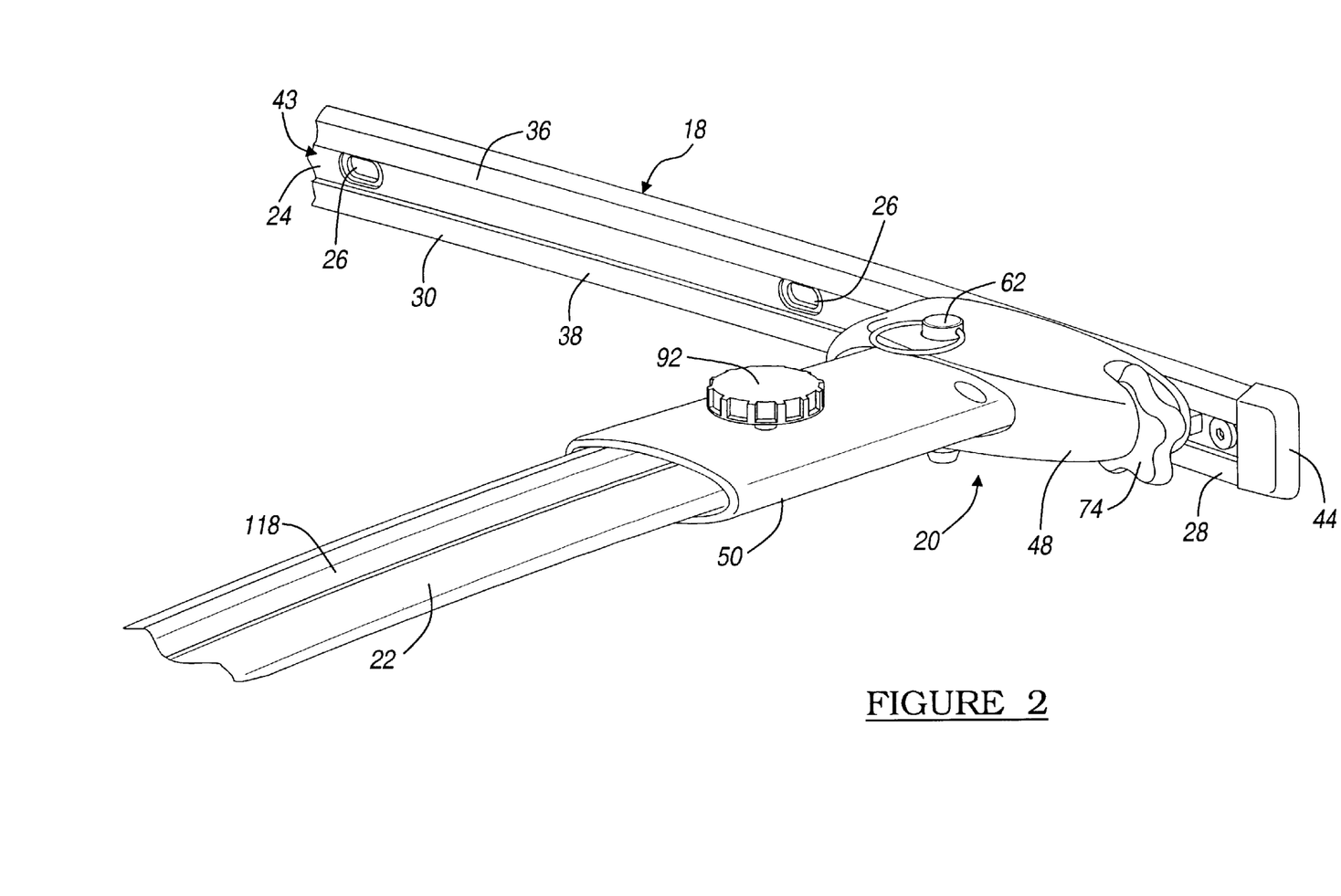
FIG. 2 is a perspective view of a cross bar, a portion of a side rail, and a cross bar assembly of the apparatus of FIG. 1.
Figure 3:
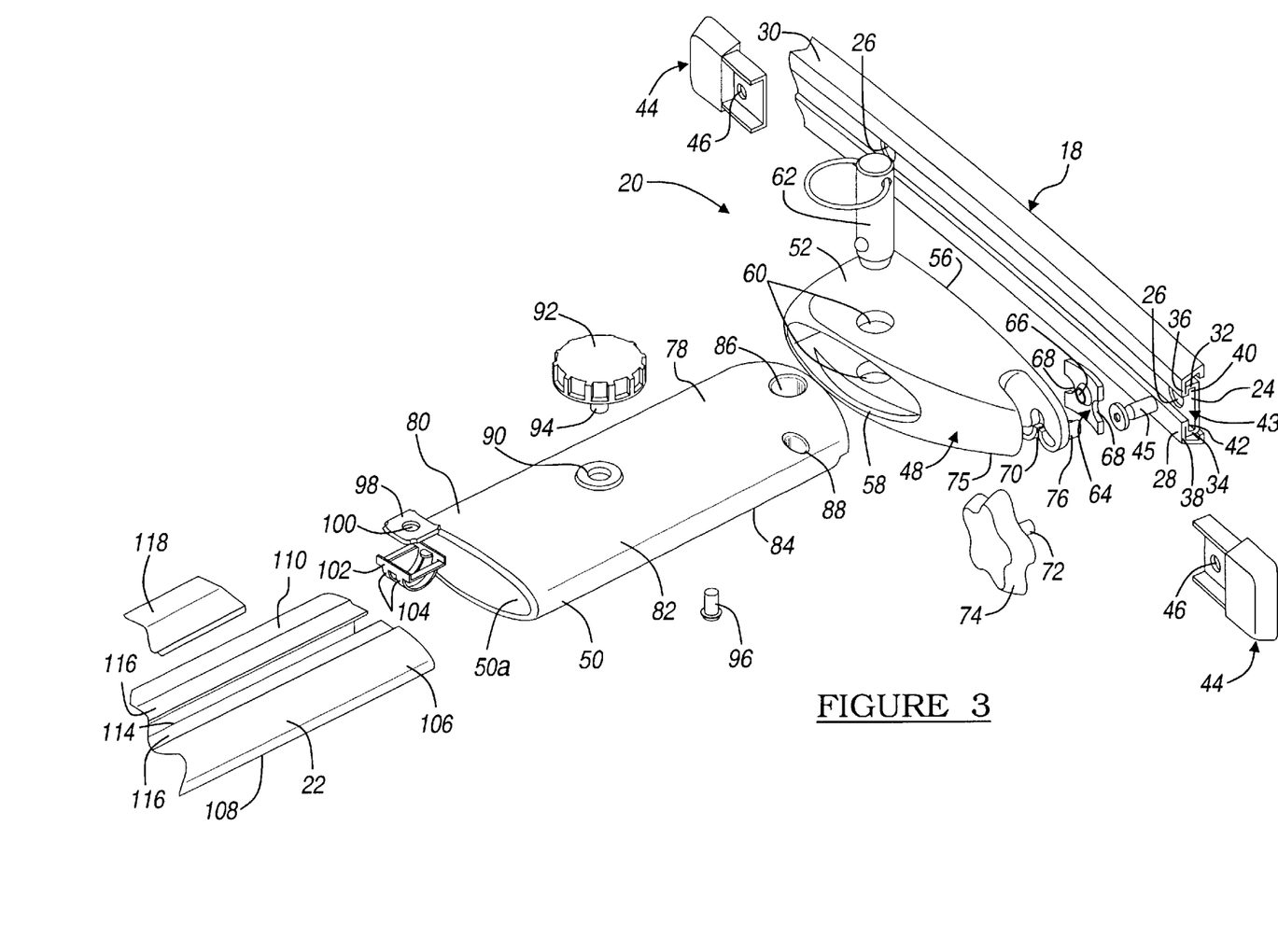
FIG. 3 is an exploded perspective view of the cross bar and the cross bar support assembly of FIG. 2.

FIGS. 2 and 3, provide a more detailed view of one of the slats 18 and its associated support assemblies 20. While FIGS. 2 and 3, and the accompanying description, focus on a single support assembly 20 and a single slat 18, it will be appreciated that the following description applies equally to both of the slats 18 and support assemblies 20 of the apparatus 10.

Each slat 18 includes a bottom wall 24 having one or more spaced apart openings 26, a first end 28, a second end 30, an upper wall 32, a lower wall 34, and inwardly turned flanges 36 and 38. Flanges 36 and 38 extend approximately ninety degrees from the upper wall 32 and the lower wall 34, respectively, to create upper well 40 and lower well 42. The wells 40 and 42 help to form a channel 43 along the length of the slat 18. Slat 18 is secured to the bed wall 14 by way of openings 26 using a plurality of conventional fastening elements such as threaded fasteners (not shown), rivnuts, etc. The first end 28 and second end 30 each include an end cap 44. End caps 44 may be secured to the first end 28 and the second end 30 in any suitable manner but are preferably secured using suitable threaded fasteners 45 that engage openings 26 via apertures 46 of the end caps 44.

Support assembly 20 comprises a slider 48 and a cross bar connecting member 50. The slider 48 generally includes an upper portion 52, a lower portion 54, a side rail contact portion 56, and a bore 58 forming a connecting member receipt portion. The upper portion 52 and the lower portion 54 each have vertically aligned apertures 60 for the receipt of a suitable fastening device, such as retaining pin 62. Connecting member 50 is sized to fit within bore 58 and to be secured within the bore portion 58 by retaining pin 62. Slider 48 may be made from any suitable material but is preferably manufactured from a polymer of suitable strength and rigidity.

Slider 48 is secured to slat 18 by way of tap plate 64. Tap plate 64 may be made of any suitable material but is preferably made of a metal, and more preferably from steel. The tap plate 64 generally includes a threaded center aperture 66 and two opposing side notches 68. Tap plate 64 is inserted within the channel 43 and can slide along the length of slat 18 within the wells 40, 42. The tap plate 64 is shaped so as to be convex in its relaxed (i.e. unlocked) position, relative to side wall 24 once installed (i.e., so as to bow away from side wall 24).

Slider 48 further includes a notched portion 69 having a threaded aperture 70 located within side rail contact portion 56. Aperture 70 threadably receives a threaded post 72 of a user graspable locking knob 74 which is partially housed in the notched portion 69. The post 72 extends through, aperture 70 to threadably engage center aperture 66 of the tap plate 64. Thus, by securing tap plate 64 to the slider 48, the control knob 74 secures the slider 48 to slat 18.

Actuation of locking knob 74 in a first direction causes tap plate 64 to be drawn towards the side rail contact portion 56 and into contact with flanges 36, 38. This clamps the side rail contact portion 56 against the slat 18 at a given position. In contrast, rotation of control knob 74 in the opposite direction causes tap plate 64 to disengage flanges 36, 38 to permit the movement of slider 48, and thus cross bar 22, along slat 18.

Slider 48 further comprises a pair of extensions 76. Each extension 76 forms a boss portion that extends outwardly from the side rail contact portion 56 to engage a respective side notch 68 of tap plate 64. Extensions 76 prevent the tap plate 64 from rotating during the rotation of locking knob 74.

It will be appreciated that the surface of side rail contact portion 56 is not linear (i.e., not perfectly flat). Rather, the surface of side rail contact portion 56 is rounded or arcuate. This helps to prevent the slider 48 from jamming against slat 18 if slat 18 is curved (i.e., bowed) inwards towards slider 48. Side rail contact portion 56 is formed with a radius of curvature as needed to ensure that the slider 48 will not jam. In one preferred form the radius of curvature is preferably between 300 cm–400 cm. Slider 48 can also slide along slats 18 that are curved (i.e., bowed) outwardly and away from slider 48 without jamming.

Cross bar 22 is secured to its associated support assemblies 20 by connecting members 50. Each connecting member 50 is an elongated, tubular-like member that can be made of any suitable material, such as a polymer of a suitable strength and rigidity, or from aluminum. The connecting member 50 has a hollow 50a to enable receipt of one end of cross bar 22 therein. The connecting member 50 is generally comprised of a first end 78, a second end 80, a top portion 82, and a bottom portion 84.

First end 78 is received by connecting member receipt portion 58 of the slider 48. First end 78 includes a through hole 86 that is aligned with apertures 60 when the first end 78 is, inserted into connecting member receipt portion 58. Once aligned, pin 62 is inserted through apertures 60 and through hole 86 to pivotally secure connecting member 50 to the slider 48. The use of pin 62 allows the connecting member 50, and associated cross bar 22, to pivot relative to slider 48. Further, when the cross bar 22 is not in use, the cross bar 22 and connecting member 50 may be separated from slider 48 by removing the pin 62 from slider 48.

First end 78 further includes a tie-down aperture 88. Tie-down aperture 88 may be used to further help secure articles to the apparatus 10. The tie-down aperture 88 may be used with any suitable tie-down device, such as a bungee cord, nylon strap, etc., that help secure articles to the cross bar 22.

Generally located between first end 78 and second end 80 is an aperture 90 for receipt of a locking member 92. Locking member 92 includes a threaded post 94 that extends through aperture 90 and is held in place by fastener 96. Threaded post 94 engages a threaded aperture 100 of a cross bar tap plate 98. Cross bar tap plate 98 is seated within tap plate retainer 102. Retainer 102 includes curved portions 104 that function as springs to bias tap plate 98 against an inside surface of the cross bar 22, as will be described momentarily.

Referring to FIGS. 1 and 3, cross bar 22 is generally comprised of an elongated tubular, oval shaped (in cross-section) member having a top portion 106, a bottom portion 108, a first outer most end 110, and a second outer most end 112 (FIG. 1). In FIG. 3, the top portion 106 has a channel 114 that extends the length of the top portion 106. The channel 114 is bordered by recessed flanges 116. A majority of the channel 114 is covered by a rubber bumper 118. The rubber bumper 118 is seated within the recessed flanges 116. Rubber bumper 118 does not completely extend to the first end 110 and to the second end 112, thus leaving portions of the channel 114 exposed at ends 110 and 112.

The areas of channel 114 exposed at first end 110 and at second end 112 are inserted within their respective connecting members 50 so that the exposed portions at each end of the channel 114 are located within the connecting members 50. Tap plate 98 and retainer 102 are disposed within the channel 114 and curved portions 104 of the tap plate serve to hold the tap plate 98 against the recessed flanges 116. Threaded post 94 extends through channel 114 into engagement with threaded aperture 100.

When the locking member 92 is rotated in a first direction the tap plate 98 is used to clamp the end 106 of the cross bar 22 to the connecting member 50. The same action occurs at the opposite end 112 of the cross bar 22. This secures the cross bar 22 in position and prevents it from sliding inwardly or outwardly relative to the connecting member 50. When the locking member 92 is rotated in a second direction, the tap plate 98 is loosened, thus allowing the ends 110,112 of the cross bar 22 to be drawn out from, or to recede within, their respective connecting members 50 as the cross bar 22 is moved along the non-linear slats 18.

Figure 4:
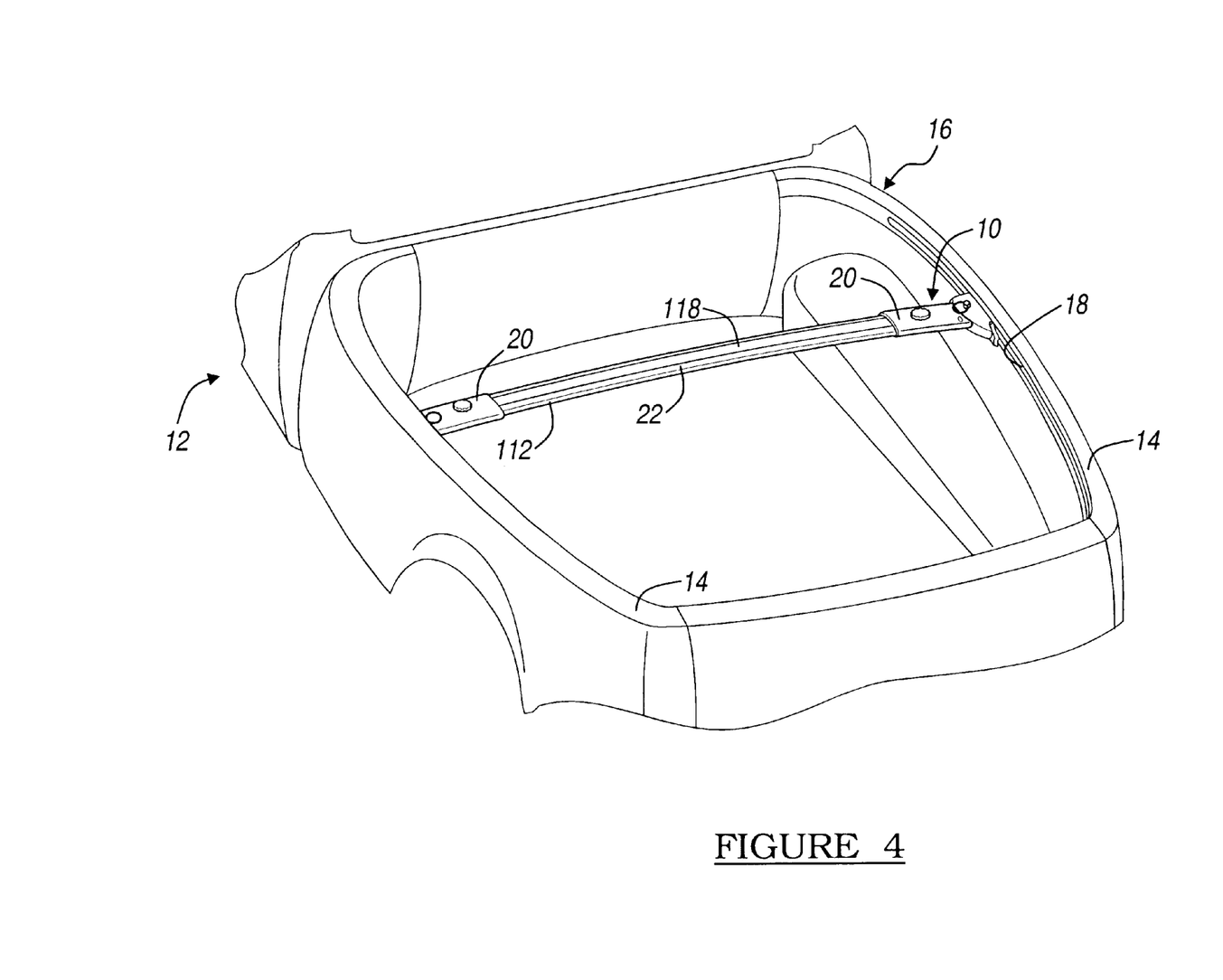
FIG. 4 is a perspective view of the vehicle and vehicle article carrier apparatus of FIG. 1 with one cross bar disposed at a point where the spacing between slats of the apparatus is the greatest.
Figure 5:
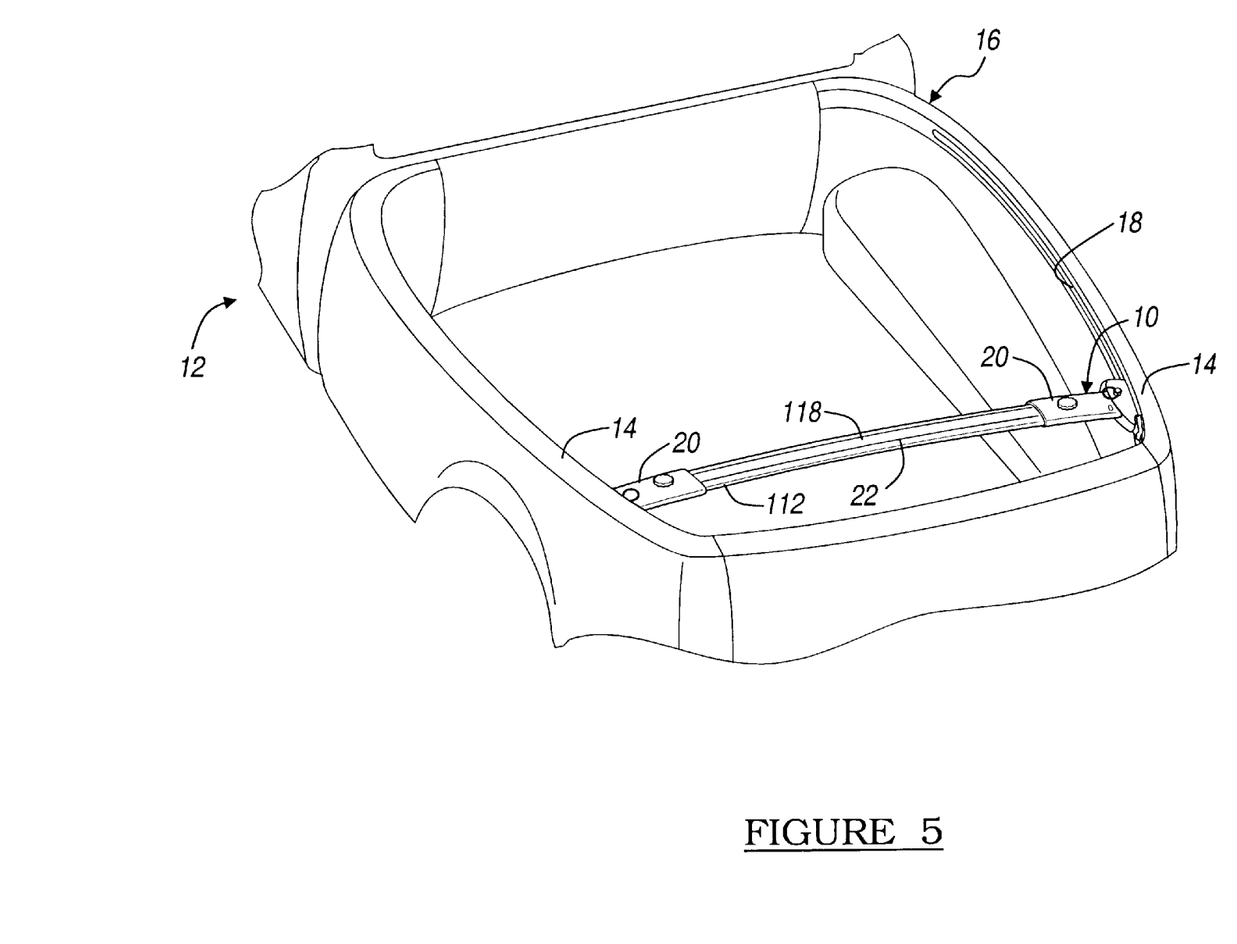
FIG. 5 is a perspective view of the vehicle and vehicle article carrier apparatus of FIG. 1 with one cross bar disposed at a point where the spacing between slats of the apparatus is the smallest.

Referring to FIG. 4, the apparatus 10 can be seen where one cross bar 22 is disposed at the point where the spacing between the slats 18 is greatest. In FIG. 5, it can be seen how the apparatus 10 allows for the decreasing distance between the slats 18 by enabling the outermost ends 110, 112 of the cross bar to be gradually and increasingly received within their respective connecting members 50.

To further enhance sliding movement of the slider 48 along slats 18 that are curved, sliders 48 can each pivot relative to their respective connecting members 50 as side rail contact portions 56 of the slider 48 move along the slats 18. Thus, as the sliders 48 move along slats 18 that are concave to each slider 48, the sliders 48 pivot to follow the curvature of its associated slat 18. As the sliders 48 move along slats 18 that are convex to the sliders 48, the outermost ends 110, 112 of the cross bar 22 recede within their respective connecting members 50 to follow the curvature of the slats 18. The curved side rail contact portions 56 also help to allow the sliders 48 to follow curved slats or side rails during positioning of the cross bar 22 without becoming jammed between the slats or side rails.

The apparatus 10 thus enables a cross bar to be used with nonparallel or bowed support rails. This significantly enhances the utility of the apparatus 10 by allowing it to be used with a wider variety of vehicle body styles where non-parallel or bowed support rails are employed. Most importantly, the cross bars 22 can be slidably adjustably positioned on the slats 18 as needed without jamming or other like interference.

The description of the invention is merely exemplary in nature and, thus, variations that do not depart from the gist of the invention are intended to be within the scope of the invention. Such variations are not to be regarded as a departure from the spirit and scope of the invention.

what is claimed is:

1. A vehicle article carrier apparatus adapted to be disposed on a body surface of a vehicle for supporting articles thereon, said apparatus comprising:
    a pair of non-linear support rails adapted to be secured to said body surface in spaced apart relation to one another;
    a cross bar having a pair of outermost ends for supporting articles thereon;
    at least one cross bar supporting assembly secured to one of said outermost ends of said cross bar for supporting said one outermost end of said cross bar from said one of said support rails;
    said cross bar supporting assembly including:
        a connecting member secured to said one outermost end of said cross bar and permitting sliding linear movement of said one outermost end relative thereto to change an effective length of said cross bar as said cross bar is moved along said non-linear support rails; and
        a slider member secured between said connecting member and said one support rail for enabling pivotal movement of said connecting member relative to said one support rail.

2. The apparatus of claim 1, wherein said connecting member and said cross bar comprise a cooperative locking assembly for enabling a user to clamp said connecting member to said one outermost end of said cross bar once said cross bar is adjusting positioned along said one support rail.

3. The apparatus of claim 1, wherein said slider and said one support rail include a cooperative locking for assembly for enabling a user to secure said cross bar supporting assembly at a desired position along said one support rail.

4. The apparatus of claim 1, wherein said slider includes a curved surface for contacting said one support rail and preventing jamming as said cross bar supporting assembly is moved along said one support rail.

5. A vehicle article carrier apparatus adapted to be disposed on an outer body surface of a vehicle for supporting articles thereon, said apparatus comprising:
- a pair of non-linear support rails adapted to be secured to said outer body surface in spaced apart relation to one another;
- a cross bar member having a pair of outermost ends;
- at least one cross bar supporting assembly securable to said support rails to support articles thereon, said cross bar assembly including:
  - a pair of connecting members secured to said cross bar member at opposite ends of said cross bar member for supporting said cross bar member between said support rails;
  - at least one of said connecting members being movable relative to said cross bar to change an effective length of said cross bar as said cross bar is moved along said non-linear support rails; and
  - a slider member secured in between said one connecting member and an associated one of said support rails, and pivotally to said one connecting member, for enabling pivotal movement of said one connecting member relative to said associated one of said support rails as said cross bar is moved along said support rails.

6. The apparatus of claim 5, wherein said slider member includes a curved contact portion for contacting said associated one of said support rails as said cross bar supporting assembly is moved along said non-linear support rails.

7. The apparatus of claim 5, wherein said slider member and said one connecting member are releasably secured to each other via a user removable locking pin.

8. The apparatus of claim 5, wherein said slider member includes a bore for receiving an end portion of said one connecting member therein.

9. The apparatus of claim 5, wherein:
- said one connecting member includes a bore for receiving an outermost end of said cross bar member therein, and an opening in communication with said bore;
- said cross bar member includes a channel formed to align with said opening in said connecting member; and
- a locking assembly for securing said connecting member to said cross bar member while permitting longitudinal sliding movement of said connecting member relative to said cross bar member.

10. A vehicle article carrier apparatus adapted to be disposed on a body surface of a vehicle for supporting articles above said body surface, said apparatus comprising:
- a pair of support rails adapted to be arranged nonparallel to one another on said body surface in a spaced apart relation to one another;
- a pair of slider members secured to each of said support rails;
- a pair of connecting members secured to each of said slider members; and
- a cross bar coupled at opposite ends thereof to said connecting members for supporting articles thereon above said body surface;
- wherein an effective length of said cross bar is increased and decreased as said opposite ends thereof engage within said connecting members; and
- said connecting members operating to pivot relative to their respective said slider members as said cross bar is moved along said support rails.

11. The apparatus of claim 10, wherein each said slider member is secured to said support rail by a tap plate.

12. The apparatus of claim 10, wherein each said connecting member is secured to its associated said slider member by a locking pin.

13. The apparatus of claim 10, further comprising a user engagable locking knob; and
- wherein the position of said slider member on said support rail is maintained through actuation of said locking knob to cause friction between said slider, said tap plate, and said support rail.

14. The apparatus of claim 10, wherein said slider includes a curved surface, said curved surface closely abutting said support rails to provide clearance between said slider and said support rails as said slider is moved along said non-parallel side rails.

15. The apparatus of claim 10, wherein the position of said cross bar within said connecting members is maintained through actuation of a user engageable locking elements for clamping said opposite ends of said cross bar to connection members.

16. A vehicle article carrier apparatus adapted to be disposed on an outer body surface of a vehicle for supporting articles above said outer body surface, said apparatus comprising:
- a pair of non-linear support rails adapted to be secured to said outer body surface in spaced apart relation to one another;
- a cross bar member having a pair of outermost ends; and
- a pair of support assemblies secured to said cross bar member at opposite ends of said cross bar member for supporting said cross bar member between said support rails;
- wherein the effective length of said cross bar either increases or decreases as said cross bar is moved along said non-linear support rails.

17. The apparatus of claim 16, wherein each of said support assemblies is comprised of a connecting member and a slider.

18. The apparatus of claim 17, wherein said slider and said one support rail include a cooperative locking assembly for enabling a user to secure said cross bar supporting assembly at a desired position along said one support rail.

19. The apparatus of claim 17, wherein said connecting member and said cross bar comprise a cooperative locking assembly for enabling a user to clamp said connecting member to said one outermost end of said cross bar once said cross bar is adjustably positioned along said one support rail.

20. The apparatus of claim 17, wherein said slider includes a curved surface for contacting said one support rail and preventing jamming as said cross bar supporting assembly is moved along said one support rail.

21. A vehicle article carrier apparatus adapted to be disposed on a body surface of a vehicle for supporting articles thereon, said apparatus comprising:
- a pair of non-linear support rails adapted to be secured to said body surface in spaced apart relation to one another;
- a cross bar having a pair of outermost ends for supporting articles thereon;
- at least one cross bar supporting assembly secured to one of said outermost ends of said cross bar for supporting said one outermost end of said cross bar from said one of said support rails;

said cross bar supporting assembly including:
- a connecting member secured to said one outermost end of said cross bar and permitting sliding linear movement of said one outermost end relative thereto to change an effective length of said cross bar as said cross bar is moved along said non-linear support rails; and
- a slider member secured between said connecting member and said one support rail for enabling pivotal movement of said connecting member relative to said one support rail;

wherein said connecting member and said cross bar comprise a cooperative locking assembly for enabling a user to clamp said connecting member to said one outermost end of said cross bar once said cross bar is adjustably positioned along said one support rail;

wherein said slider and said one support rail include a cooperative locking assembly for enabling a user to secure said cross bar supporting assembly at a desired position along said one support rail; and wherein said slider includes a curved surface for contacting said one support rail and preventing jamming as said cross bar supporting assembly is moved along said one support rail.

* * * * *